(12) United States Patent
Liang (10) Patent No.: US 7,469,978 B2
(45) Date of Patent: Dec. 30, 2008

(54) BLOCK-SHAPE CONTAINER WHICH CAN BE ASSEMBLED INTO AND DISASSEMBLED FROM A COMPUTER CASING

(75) Inventor: Chien-Fa Liang, Chung-Ho (TW)

(73) Assignee: Super Micro Computer, Inc., San Jose, CA (US)

( * ) Notice: Subject to any disclaimer, the term of this patent is extended or adjusted under 35 U.S.C. 154(b) by 145 days.

(21) Appl. No.: 11/501,017

(22) Filed: Aug. 9, 2006

(65) Prior Publication Data

US 2008/0036338 A1 Feb. 14, 2008

(51) Int. Cl.
*A47B 97/00* (2006.01)
(52) U.S. Cl. .................................................... 312/223.2
(58) Field of Classification Search .............. 312/257.1, 312/223.1, 223.2, 319.1; 361/683, 684, 685, 361/724, 725, 726, 727, 728, 747
See application file for complete search history.

(56) References Cited

U.S. PATENT DOCUMENTS 5,224,024 A * 6/1993 Tu et al. ..................... 361/831
6,728,109 B1 * 4/2004 Wu ............................. 361/747
6,935,604 B2 * 8/2005 Chen .......................... 248/694
7,038,907 B2 * 5/2006 Chen .......................... 361/685

* cited by examiner

*Primary Examiner*—James O Hansen
(74) *Attorney, Agent, or Firm*—Troxell Law Office, PLLC (57) ABSTRACT

A block-shape container which can be assembled into and disassembled from a computer casing, is composed of a block-shape container; a computer casing, a side of which is provided with a locking slot, with ear parts being located above the insertion slot, with the ear parts being provided with shaft holes, and with an upper wall of the insertion slot being provided with insertion holes; and a press plate, two sides of which are provided with shaft ends to be loosely connected into the shaft holes, a front end of which is formed downward with a projection part for locking; After the container is inserted into the insertion slot, such that the container, which is latched with the cartridges, can be locked on the computer casing without using screws, and can be quickly assembled or disassembled.

6 Claims, 8 Drawing Sheets

BLOCK-SHAPE CONTAINER WHICH CAN BE ASSEMBLED INTO AND DISASSEMBLED FROM A COMPUTER CASING

BACKGROUND OF THE INVENTION (a) Field of the Invention

The present invention relates to a block-shape container which can be assembled into and disassembled from a computer casing, and more particularly to a block-shape container which can be assembled into and disassembled from a computer casing without using screws.

(b) Description of the Prior Art

It is known that computer equipment, such as an extractable hard disk drive, a CD-ROM drive, or a server, should be installed into a cartridge and then assembled into a computer casing one by one. However, these known devices should be fixed into the cartridges by screws; therefore, it will be very awkward and can waste labor hours in assembling and disassembling the cartridges. Moreover, the cartridges are generally in a cubical shape, and they are installed into the computer casing at positions that never change, without being able to be flexibly located.

SUMMARY OF THE INVENTION

The primary object of present invention is to provide a block-shape container which can be assembled into and disassembled from a computer casing. The container is latched with cartridges and can be locked on a computer casing without using screws, such that it can be quickly assembled and disassembled.

Another object of the present invention is to provide a block-shape container which can be assembled into and disassembled from a computer casing. The present invention is a cubical container which is latched with the cartridges, and its any wall can be optionally locked onto an upper wall of an insertion slot of the computer casing, such that the cartridges can be optionally configured in a vertical or horizontal direction.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
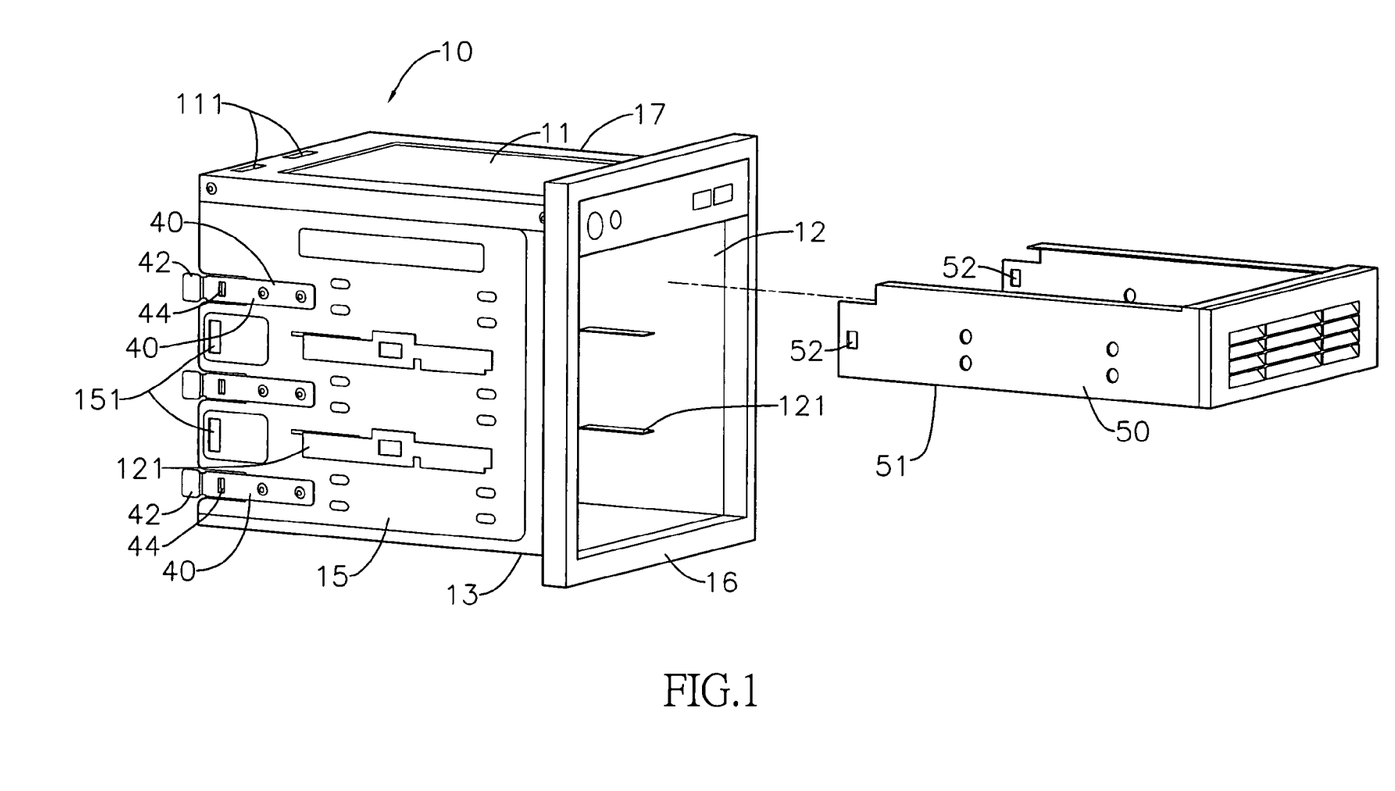
FIG. 1 shows an exploded view of a container and a cartridge of the present invention.
Figure 2:
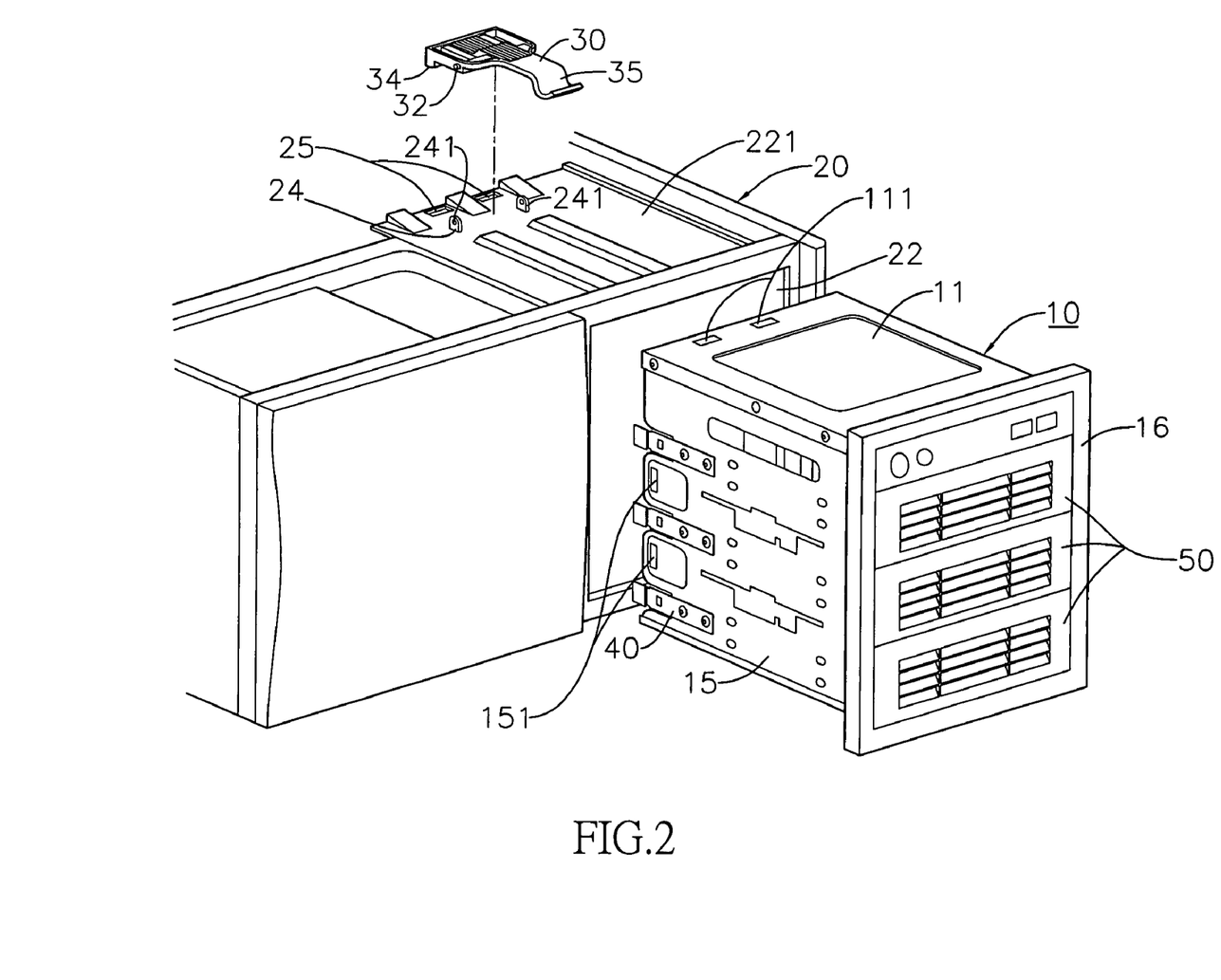
FIG. 2 shows an exploded view of a container and a computer casing of the present invention.

Referring to FIG. 1 and FIG. 2, the present invention is to provide a block-shape container which can be assembled into and disassembled from a computer casing, including a block-shape container 10, which is provided with an upper, lower, left, and right walls 11, 13, 15, 17, and an interior of which is transfixed with a locking slot 12, with locking holes 111, 151 being located on rear end surfaces of the neighboring upper wall 11 and left wall 15, respectively; a computer casing 20, a side of which is provided with an insertion slot 22, with an upper wall 221 above the insertion slot 22 being provided with ear parts 24 having shaft holes 241, and with a rear rim of the upper wall 221 being provided with insertion holes 25; and a press plate 30, two sides of which are provided with shaft ends 32 to be loosely connected into the shaft holes 241, a side rim at a front end of which is formed downward with a longitudinal projection part 34 for locking, and a rear end of which is formed with an arc part 35, with a lower rim of the arc part 35 being formed with a contact part 351 to be in contact with the upper wall 221.

After the container 10 is inserted into the insertion slot 22 to be positioned, the locking hole 111 can be aligned with the insertion hole 25 to form a through-hole, and projection part 34 can be locked into and elastically displaced out of the insertion hole 25 and the locking hole 111.

Figure 3:
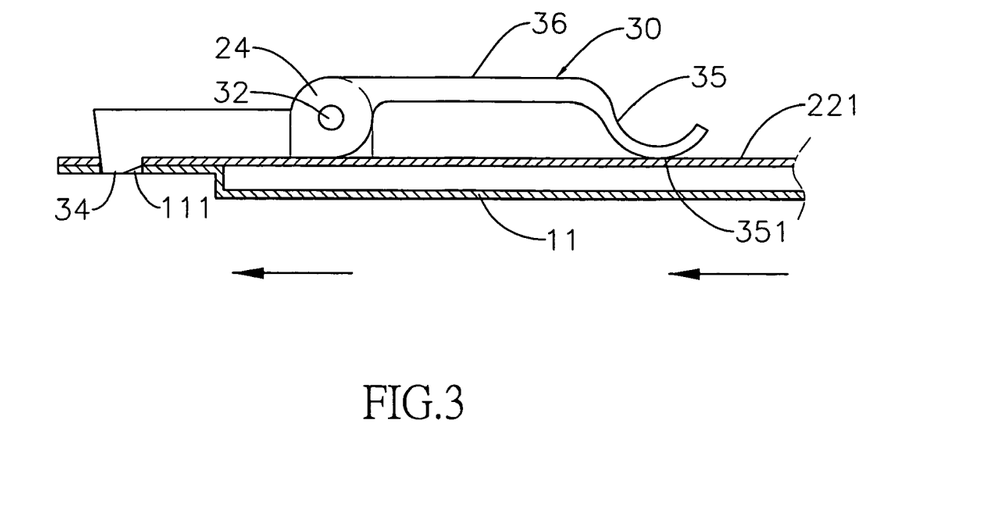
FIG. 3 shows a local cross sectional view of a press plate which is locked and positioned into a container of the present invention.
Figure 4:
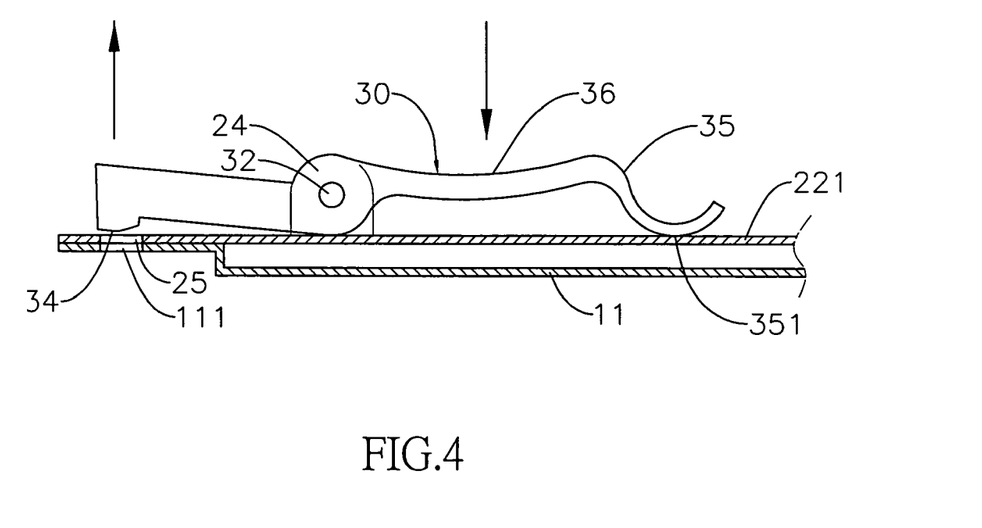
FIG. 4 shows a local cross sectional view of a press plate which is removed from a container of the present invention.

Referring to FIG. 3 and FIG. 4, the press plate 30 is provided with flexibility that it can be elastically deformed when being subjected to pressure, such that a press part 36 is formed between the contact part 351 and the shaft end 32. When the press part 36 is subjected to pressure, it will be deformed elastically using the shaft end 32 and the contact part 351 as pivots, such that the projection part 34 will be displaced upward to be released from the insertion holes 25 and the locking holes 111.

Figure 5:
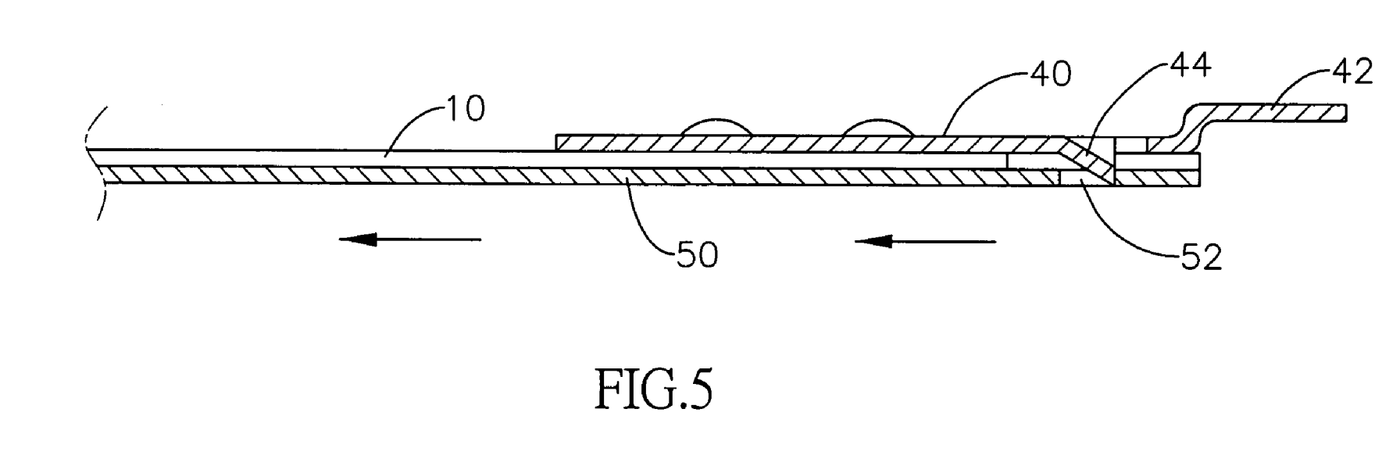
FIG. 5 shows a local cross sectional view of a cartridge which is locked and positioned on a container of the present invention.
Figure 6:
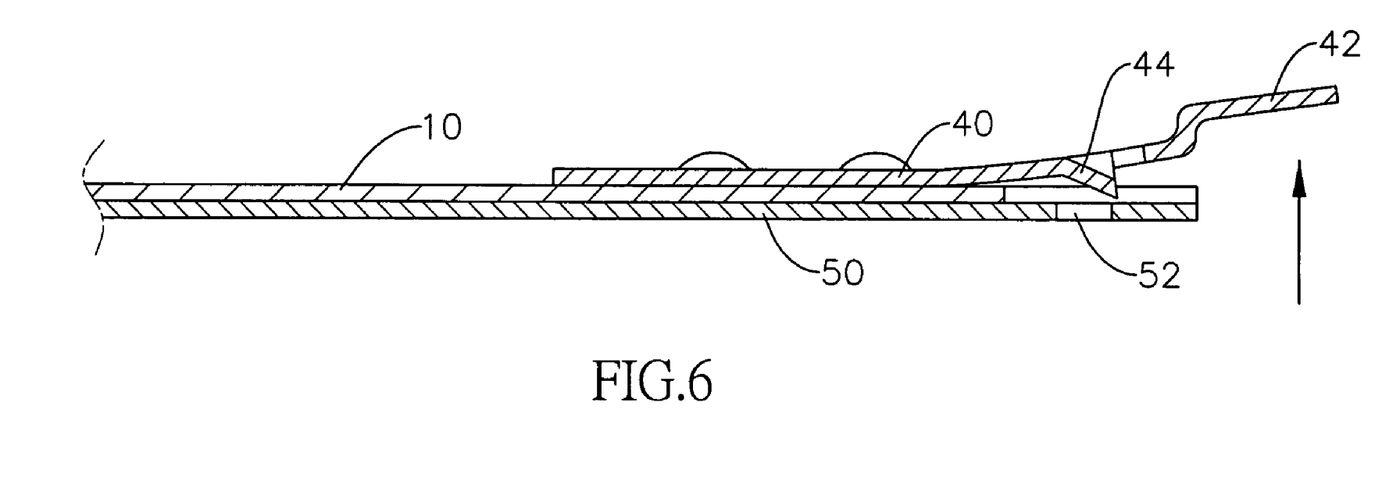
FIG. 6 shows a local cross sectional view of a cartridge which is not locked on a container of the present invention.

Referring to FIG. 5 and FIG. 6, an appearance of the container 10 is in a cubical shape, and its left and right walls 15, 17 are fixed with at least more than one spring leaf 40 respectively. A tail part of the spring leaf 40 is provided with a lifting end 42, and a rear side of which is punched into an abut part 44 which is tilted inward.

Figure 7:
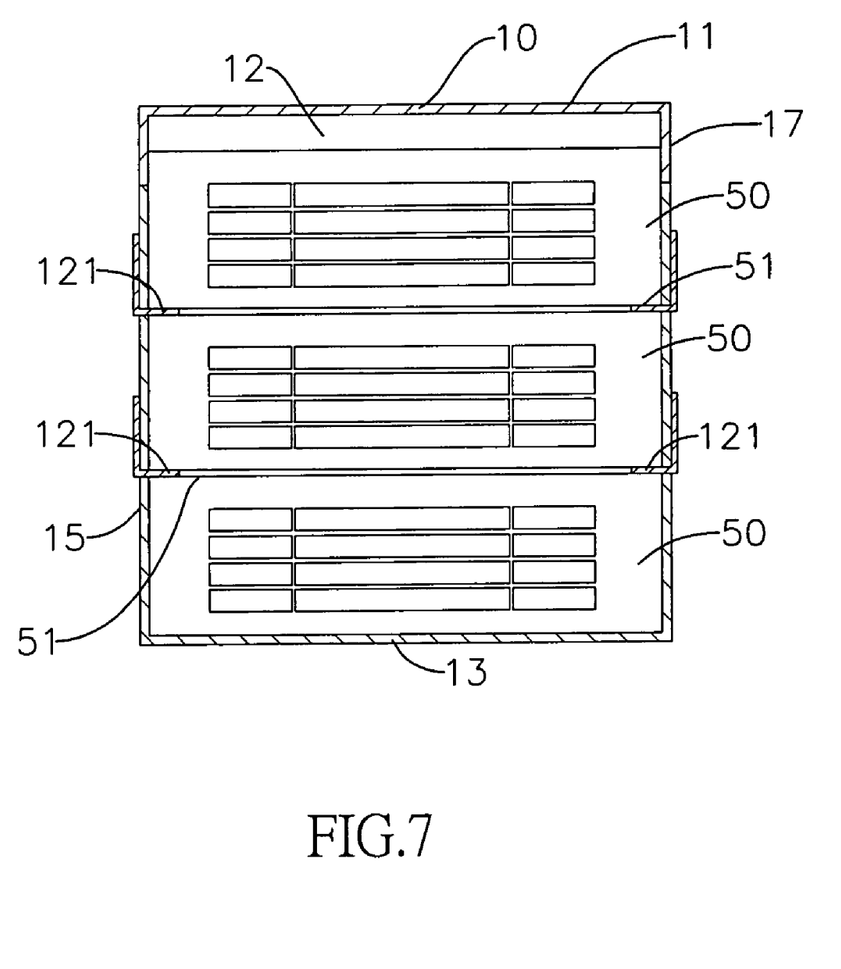
FIG. 7 shows a cross sectional view of a cartridge which is gliding into a container of the present invention.

Referring to FIG. 7, projection pieces 121 are located on left and right walls of the locking slot 12 to serve as rails. A bottom edge 51 of the cartridge 50 is gliding into the locking slot 12 following the two projection pieces 121, two side walls at a front end of the cartridge 50 are provided with hooking holes 52 respectively, and the abut parts 44 are locked into the hooking holes 52 to fix the cartridge 50 (as shown in FIG. 5).

Accordingly, a front rim of the container 10 is fixed with an outer frame 16 (as shown in FIG. 1).

Figure 9:
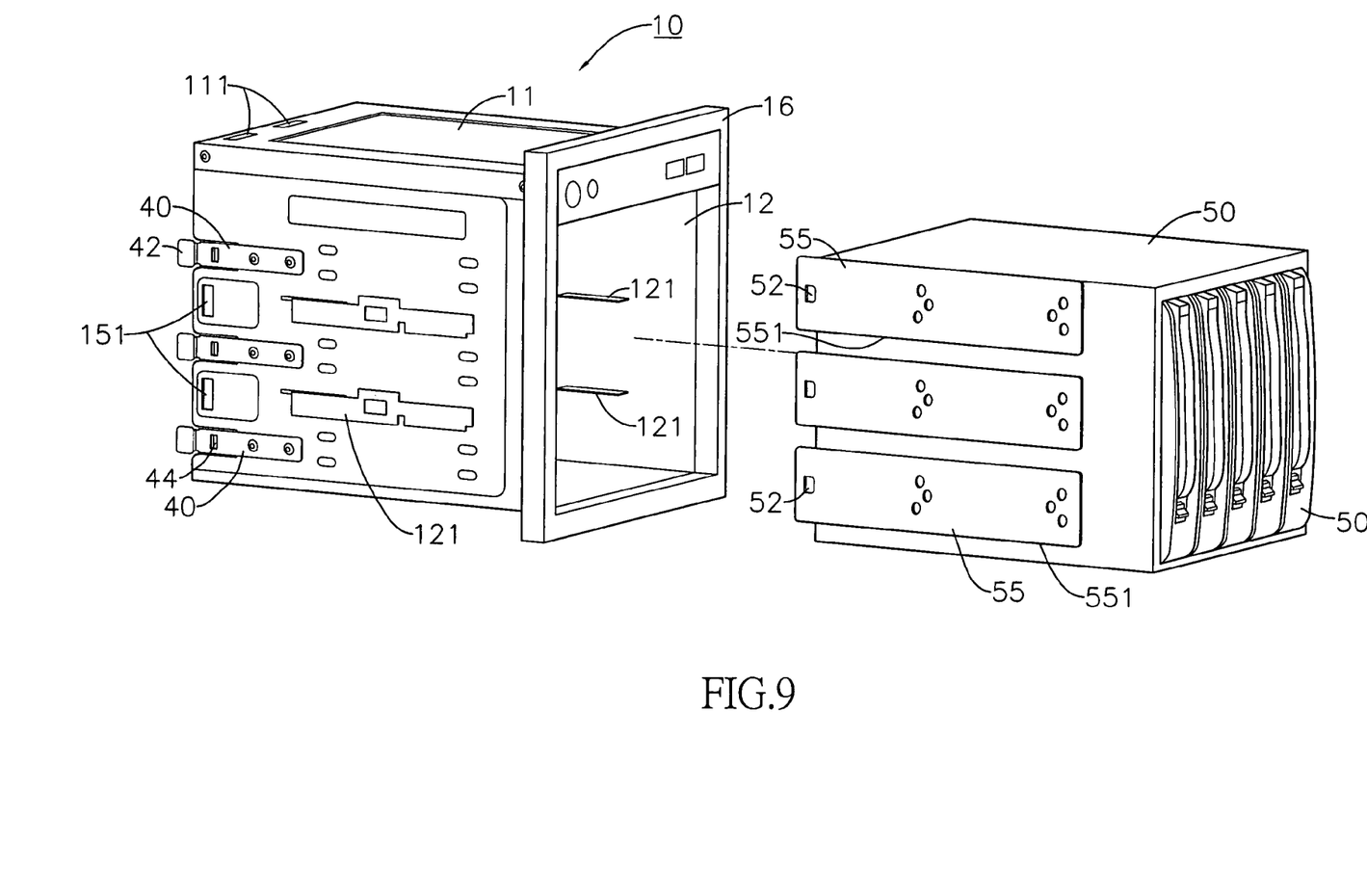
FIG. 9 shows an exploded view of another embodient of a cartridge and a container of the present invention.

Referring to FIG. 9, the projection pieces 121 are located on the left and right walls of locking slot 12 to serve as the rails, the bottom edge 51 of cartridge 50 is gliding into the locking slot 12 following the two projection pieces 121, the cartridge 50 can be in the cubical shape, and its left and right walls are fixed with a plurality of projection plates 55 respectively. A lower edge 551 of the projection plate 55 can be gliding on the projection pieces 121, and a front end of the projection plate 55 is provided with the hooking holes 52. The cartridge 50 is gliding into the locking slot 12 of container 10, and the abut part 44 of spring leaf 40 is locked into the hooking hole 52.

Referring to FIG. 1, a cartridge 50 is in a cubical shape, an inner slot of which can be fixed with a computer accessory such as a hard disk drive or a server, and a bottom edge 51 of which is gliding along a surface of a projection piece 121. As shown in FIG. 5, after the cartridge 50 is glided into a locking slot 12 and is positioned, an abut part 44 is gliding into a hooking hole 52. At this time, the cartridge 50 is locked and positioned into the locking slot 12. Referring to FIG. 6, when the cartridge 50 is to be taken out of the locking slot 12, a lifting end 42 is lifted outward by human fingers, such that the abut part 44 is displaced upward elastically to be released from the hooking hole 52; therefore, the cartridge 50 can be easily pulled out of the locking slot 12.

Referring to FIG. 2, the locking slot 12 of container 10 is glidingly fixed by the plurality of cartridges 50, and then the container 10 is inserted into an insertion slot 22 of a computer casing 20. As shown in FIG. 3, after the container 10 is completely inserted into the insertion slot 22, as a press plate 30 is a plastic which is formed integrally and is flexible (elastic), two projection parts 34 at a left and right sides of a lower front edge of the press plate 30 can be locked into insertion holes 25 and locking holes 111, thereby fixing the container 10 into the insertion slot 22. Referring to FIG. 4, when the container 10 is to be taken out of the insertion slot 22, a user uses fingers (or other tool) to press on a press part 36 from top to bottom, such that the press plate 30 can be elastically deformed using a shaft end 32 and a contact part 351 as two pivots. Therefore, the projection parts 34 will be displaced upward elastically to be released from the insertion holes 25 and the locking holes 111, and the container 10 can be pulled out of the insertion slot 22 of computer casing 20. In addition, when the exerted force is released, the press plate 30 will be elastically restored to its original state.

Figure 8:
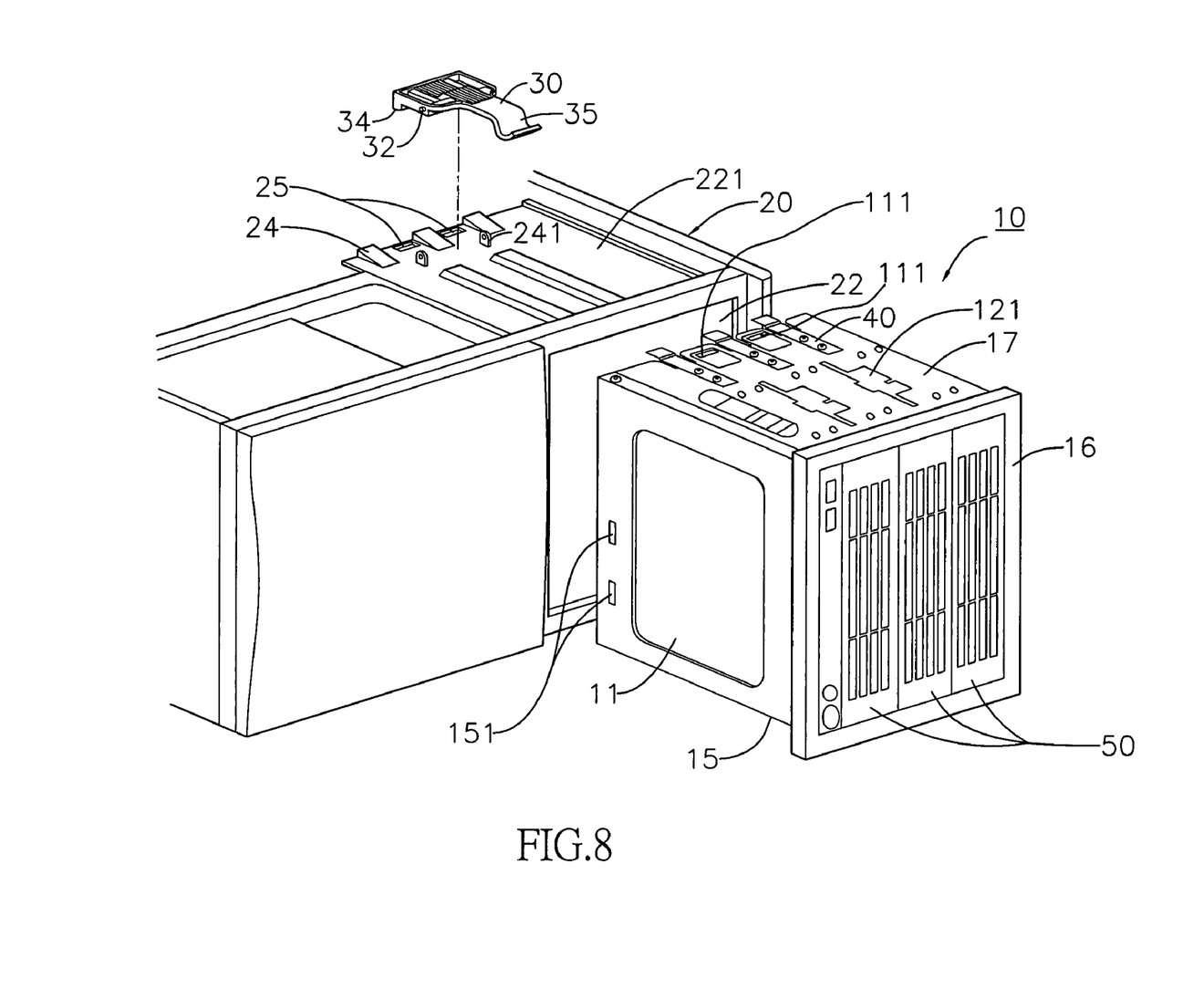
FIG. 8 shows an exploded view of another embodient of a container which is inserted into a computer casing of the present invention.
Figure 10:
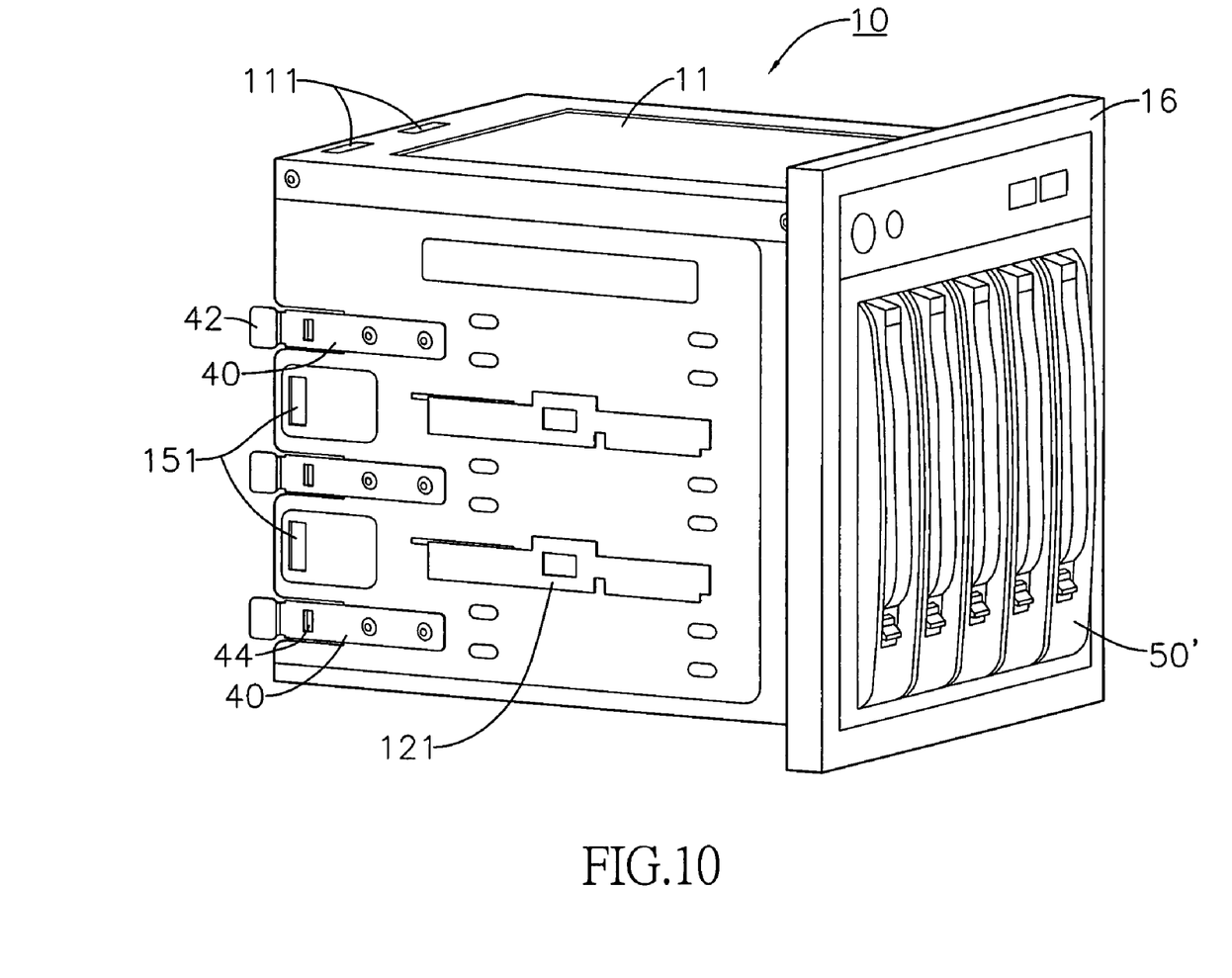
FIG. 10 shows a perspective view of another embodient of a cartridge and a container of the present invention.

Referring to FIG. 8, as the locking holes 111, 151 can be located on an upper, lower, left, and right walls 11, 13, 15, 17, and the container 10 and the insertion slot 22 of casing 20 are both in a cubical shape, with this kind of design, the locking holes 111, 151 on any wall of any container 10 can be chosen to be hooked with the projection parts 34. As shown in FIG. 9 and FIG. 10, the cartridge 50 is in a cubical shape, an interior of which can be inserted with a plurality of small cartridges 50', and side walls of which are provided with a plurality of projection plates 55. A lower edge 551 of the projection plate 55 is glidingly fixed on a surface of the projection piece 121, such that the entire cartridge 50 can be locked into the locking slot 12.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A block-shape container assembly which can be assembled into and disassembled from a computer casing, comprising:

a block-shape container provided with an upper, lower, left, and right walls, and an interior of which is transfixed with a locking slot, locking holes being located on rear end surfaces of the neighboring upper wall and left wall, respectively;

a computer casing, a side of the computer casing being provided with an insertion slot, with an upper wall above the insertion slot being provided with ear parts having shaft holes, and with a rear rim of the upper wall being provided with insertion holes; and a press plate, two sides of the press plate being provided with shaft ends to be loosely connected into the shaft holes, a side rim at a front end of which is formed downward with a longitudinal projection part for locking, and a rear end of which is formed with an arc part, with a lower rim of the arc part being formed with a contact part to be in contact with the upper wall;

wherein after the container is inserted into the insertion slot, the locking holes of the upper wall are aligned with the insertion holes to form at least one through-hole, and wherein the projection part is able to be locked into and elastically displaced out of the at least one through hole.

2. The block-shape container assembly which can be assembled into and disassembled from a computer casing, according to claim 1, wherein the press plate is provided with flexibility that it can be elastically deformed when being subjected to pressure, such that a press part is formed between the contact part and the shaft ends; when the press part is subjected to pressure, it is able to be deformed elastically using the shaft ends and the contact part as pivots, and the projection part being displaced upward to be released from the at least one through hole.

3. The block-shape container assembly which can be assembled into and disassembled from a computer casing, according to claim 1, wherein an appearance of the container is in a cubical shape, and its left and right walls are fixed with at least more than one spring leaf respectively; a tail end of each spring leaf being provided with a lifting end, and a rear end of the lifting end being punched into an abut part which is tilted inward.

4. The block-shape container assembly which can be assembled into and disassembled from a computer casing, according to claim 1, wherein projection pieces are located on the left and right walls of the container to serve as rails, a bottom edge of a cartridge is guided into the locking slot following the projection pieces, two side walls at a front end of the cartridge are provided with hooking holes respectively, and abut parts are locked into the hooking holes to fix the cartridge.

5. The block-shape container assembly which can be assembled into and disassembled from a computer casing, according to claim 1, wherein a front rim of the container is fixed with an outer frame.

6. The block-shape container assembly which can be assembled into and disassembled from a computer casing, according to claim 1, wherein projection pieces are located on the left and right walls of the container to serve as rails, a bottom edge of a cartridge is guided into the locking slot following the projection pieces, the cartridge can be in a cubical shape, and its left and right walls are fixed with a plurality of projection plates, respectively; a lower edge of each projection plate being able to be guided on the projection pieces, a front end of each projection plate being provided with a hooking holes, the cartridge being guided into the locking slot of the container, and abut parts of spring leafs located on the container are locked into the hooking holes.

* * * * *